United States Patent [19]

Hargis et al.

[11] Patent Number: 5,674,951

[45] Date of Patent: Oct. 7, 1997

[54] ABRASION-RESISTANT AND LOW FRICTION COATING COMPOSITIONS

[75] Inventors: I. Glen Hargis, Tallmadge; Charles M. Kausch; Russell A. Livigni, both of Akron, all of Ohio; Aslam A. Malik, Cameron Park, Calif.; Earl G. Melby, Uniontown; Francis Jerome Vitus, Tallmadge, both of Ohio

[73] Assignee: GenCorp Inc., Fairlawn, Ohio

[21] Appl. No.: 510,686

[22] Filed: Aug. 3, 1995

Related U.S. Application Data

[63] Continuation-in-part of Ser. No. 246,541, May 20, 1994, abandoned.

[51] Int. Cl.$^6$ .................... C08L 75/04; C08L 75/08
[52] U.S. Cl. .................... 525/410; 525/453; 525/460; 528/44; 528/45; 528/59; 528/65; 528/70
[58] Field of Search .................... 525/410, 453, 525/460; 528/44, 45, 59, 65, 70

[56] References Cited

U.S. PATENT DOCUMENTS

| | | | |
|---|---|---|---|
| 3,096,344 | 7/1963 | Case | 260/333 |
| 4,393,199 | 7/1983 | Manser | 528/408 |
| 4,483,978 | 11/1984 | Manser | 528/408 |
| 4,707,540 | 11/1987 | Manser et al. | 528/417 |
| 4,764,586 | 8/1988 | Manser et al. | 528/362 |
| 4,898,981 | 2/1990 | Falk et al. | 568/28 |
| 4,929,666 | 5/1990 | Schmidt et al. | 524/516 |
| 4,946,992 | 8/1990 | Falk et al. | 560/277 |
| 5,000,830 | 3/1991 | Marchionni et al. | 204/157.92 |
| 5,006,624 | 4/1991 | Schmidt et al. | 526/243 |
| 5,097,048 | 3/1992 | Falk et al. | 549/511 |
| 5,115,007 | 5/1992 | Chihara et al. | |
| 5,221,707 | 6/1993 | Chihara et al. | |
| 5,543,200 | 8/1996 | Hargis et al. | 428/122 |

FOREIGN PATENT DOCUMENTS

| | | |
|---|---|---|
| 2100218 | 1/1994 | Canada. |
| 2 109 966 | 9/1972 | Germany. |
| 43 23 307 A1 | 1/1994 | Germany. |

OTHER PUBLICATIONS

Abstract of Russian Article Titled: "Synthesis of Fluorine-containing derivatives of Oxacyclobutane" Chemical Abstract: 89:10440p.

A Derwent Patent Search SKU523 yielding abstract #77–55325 by Derwent; McLean, Virginia 1979.

Article by Griffith and Brady in *Chemtech*, Jun. 1989, pp. 370–373, published by the American Chemical Society: Washington, D.C.

Article by Griffith in *Chemtech*, May 1982, pp. 290–293, published by the American Chemical Society: Washington, D.C.

An article "Uses for Nonwettable Nonstick Coating Probed" in Chemical and Engineering News published by American Chemical Society: Washington, D.C. Mar. 7, 1994, pp. 6 and 7.

*Primary Examiner*—W. Robinson H. Clark
*Attorney, Agent, or Firm*—Robert F. Rywalski; Samuel B. Laferty

[57] ABSTRACT

Coating compositions are disclosed which use a polyoxetane polymer having $CH_2$—O—$CH_2$—$R_f$ side chains where $R_f$ is a highly fluorinated alkyl or polyether. The coating compositions use polyisocyanates to create isocyanate terminated polymers from the poly(oxetanes) and from various polyols from alkylene oxides or polyester polyols. These can be reacted together to form block copolymer structures or can be linked together when the coating is crosslinked. A preferred method is to use blocked isocyanate groups. Another preferred embodiment is to use the composition as a abrasion resistant coating for glass run channels.

15 Claims, No Drawings

ABRASION-RESISTANT AND LOW FRICTION COATING COMPOSITIONS

CROSS-REFERENCE

This application is a continuation-in-part application of U.S. Ser. No. 08/246,541, filed May 20, 1994, to I. G. Hargis et al., for "Abrasion-Resistant and Low Friction Coating Compositions," now abandoned.

FIELD OF INVENTION

The present invention relates to a storage stable, heat curable, urethane composition which is useful as a low friction coating especially for elastomeric substrates such as vehicle glass run channel, door seals, and belt strips. More specifically the coating is derived from oxetane polymers with pendant fluorinated groups which results in a low surface energy coating that resists abrasion and has a low coefficient of friction. A preferred use is on glass run channels from ethylene-propylene-diene polymers (EPDM) where the coating allows automotive windows to move relative to the channel or belt strip with minimal friction.

BACKGROUND

Prior art coatings used silicone oil to reduce the friction between the channel run and the glass (e.g. U.S. Pat. Nos. 5,115,007 and 5,221,707. It is one object of this invention to eliminate the need for silicone oil by incorporating perfluorinated moieties in the coating composition. The perfluorinated moieties of this disclosure result in a coating with low surface energy surfaces and low coefficients of friction. As the EPDM based substrate common to glass run channels is pliable, the coating for this application desirably is pliable. The coating composition can be formulated for use with other substrates.

SUMMARY OF THE INVENTION

Disclosed are urethane coating compositions which use as a portion thereof oxetane polymers having highly fluorinated side chains. These highly fluorinated side chains result in a coating having high abrasion resistance and low surface energy. Nonfluorinated poly(alkylene oxide) polyols and/or polyester polyols are reacted with isocyanate terminated oxetane prepolymers to create block copolymers thereof. The block copolymers compatibilize the oxetane prepolymers with the rest of the composition and lowers the raw material costs. One disclosed and preferred use of the coating is as an abrasion resistant coating on elastomers used for glass run channels or belt strips. The coating allows the movement of glass through the channel or with respect to a belt strip with minimal frictional resistance and wear.

DETAILED DESCRIPTION

Coating compositions yielding surfaces having low surface energy and coefficient of friction are made using oxetane based polymers having ether side chains where the most distal alkyl group is highly fluorinated. The oxetane monomers are of the structure:

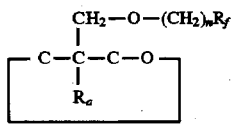

wherein n is from 1 to 5

$R_a$ is H or an alkyl of 1 to 4 or 6 carbon atoms.

$R_f$ is a highly fluorinated and optionally halogenated (e.g. where halogen is I, Cl, or Br) linear or branched alkyl or isoalkyl, wherein the alkyl has from 1 to 20 carbon atoms, or is an oxaperfluorinated polyether having from 4 to about 60 carbon atoms.

Highly fluorinated refers to the $R_f$ portion of the alkyl having the hydrogen atoms on the carbon atoms predominantly replaced by fluorine atoms such that at least 50 percent of said hydrogens are replaced, desirably at least 75 percent, and preferably at least 80, 90, or 100 percent are replaced by fluorine.

The repeat unit generated by oxetane monomers described above is:

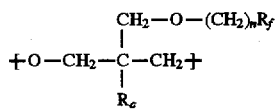

Due to the cost of the polyoxetane polymers, and to obtain the physical properties and cure rates needed for glass run channel coatings, it is desirable to minimize the weight percentage of fluorinated oxetane repeat units in the final coating while achieving good abrasion resistance and a low coefficient of friction. Accordingly, it is desirable to incorporate nonfluorinated poly(alkylene oxide) diols and polyols and/or poly(ester) diols or polyols in the coating. For simplicity, these nonfluorinated diols and polyols will be referred to as polyols.

As the polymers from the oxetane monomers having highly fluorinated side chains have minimal compatibility with nonfluorinated poly(alkylene oxides) and polyesters, it is desirable to react said polymers from oxetane monomers with poly(alkylene oxides) or polyesters or mixtures thereof using isocyanate terminal groups to form block copolymers. These block copolymers have oxetane repeat units with fluorinated side chains and repeat units of nonfluorinated alkylene oxide and/or ester along with urethane units derived from the reaction of isocyanate groups with hydroxyl groups. These oxetane repeat units are desirably present from 3 to 80 weight percent of the film forming components, more desirably from about 3 or 5 to 50 weight percent and preferably from about 3 or 5 to about 20 weight percent of the repeat units of the resulting isocyanate or blocked isocyanate terminated polymers or chain extended block copolymers.

These block copolymers prevent gross phase separation between polymers from oxetane monomers having fluorinated side chains and the poly(alkylene oxides) and/or polyesters. However, sufficient amounts of the polymers from oxetane monomers having fluorinated side chains are present on the surface of the cured coatings to impart very low friction and very high abrasion resistance.

The polymers from the oxetane monomers having fluorinated side chains are less reactive with isocyanate groups than are nonfluorinated polyols. Therefore, it is desirable to first react the polymers from oxetane monomers with fluorinated side chains with an excess equivalence of di or polyisocyanates and then add and react nonfluorinated polyols forming some block copolymers.

The reaction with the polyisocyanates can result in chain extension if the NCO:OH ratio during this step is less than 2. Preferably during any reaction of the polyisocyanates with hydroxyl terminated polymers for this application, the NCO:OH ratio is from 2:1 to 200:1, desirably from 2:1 to 20:1, more desirably from 2.5:1 to 10:1, and most preferably from 3:1 to 6:1. These ratios result in low amounts of chain extension and predominantly end-capping of the polymers with isocyanates. Preferably the polyoxetane polymers are simply end functionalized.

The polyoxetane polymers can be diluted with other hydroxyl terminated polymers and/or isocyanate terminated polymers in coating formulations to lower cost and still obtain good properties. When the other hydroxyl terminated polymers are simple polyethers without halogenated side chains they will be referred to as nonhalogenated polyethers or polymers from alkylene oxide monomers. Desirable polymers for dilution are liquid polymers of number average molecular weights from about 400 to about 10,000, desirably from about 750 to 5,000 and preferably from about 1,000 to 3,000. These polyols desirably form the residual of the repeat units of the isocyanate or blocked isocyanate terminated polymers. Thus, their repeat units desirably account for 20 to 97 weight percent and more desirably from 50 to 95 weight percent of the isocyanate or blocked isocyanate terminated polymers or chain extended isocyanate terminated block copolymers. Diols are preferred but the polyols can include triols, tetrols and higher functionality polyols. The polyols include hydroxyl terminated poly (alkylene oxide) polymers and copolymers where each alkylene unit is from 1 to 10 carbon atoms, desirably 3 to 6 carbon atoms and preferably from 3 to 4 carbon atoms. These polyols can be made from reacting alkylene oxides with strong bases. The liquid polyols may also include polyesters as described below.

The polyesters may include polycaprolactone and polyesters from the condensation of one or more polycarboxylic acids or their anhydrides having 2 to 14 carbon atoms, desirably form 2 to 10 carbon atoms, and one or more polyhydric alcohols or alkylene oxides having from 2 to 15 carbon atoms. Examples of suitable polyhydric alcohols include the following: ethylene glycol, 1,2-propylene glycol, 1,3-propylene glycol, glycerol; pentaerythritol; trimethylolpropane; and the like. Examples of polycarboxylic acids include the following: phthalic acid; isophthalic acid; terephthalic acid; tetrachlorophthalic acid; maleic acid; fumaric acid; adipic acid; malonic acid, glutaric acid, and the corresponding acid anhydrides, and acid chlorides and acid esters such as phthalic anhydride, phthaloyl chloride and the dimethyl ester of phthalic acid. Polyesters from lactones (for example ε-caprolactone) and polyacrylates, polyacetals, polycarbonates or polybutadienes containing terminal hydroxyl groups are also suitable. Any polyhydric alcohol having more than 2 hydroxyl groups or any polycarboxylic acid having more than 2 carboxylic groups used to make the polyesters desirably should be used in only very minor amounts, e.g., less than 10 or 5 percent by weight based upon the weight of the liquid hydroxyl terminated intermediate, to prevent crosslinking and gelling.

In addition to the above intermediates, generally any hydroxyl terminated intermediate known to the art and to the literature can be utilized so long as it is typically a liquid at 25° C. and has a relatively low viscosity so that the end composition has a suitable viscosity. These polymers may comprise up to 80 weight percent of the film forming portion and are more desirably from 10 to 60 weight percent of the film forming portion of the coating. For the purpose of this disclosure the film forming components of a composition are those components which would not volatilize from this thin coating in about 1 hour at 105° C.

Poly(alkylene oxide) polymers can be reacted with isocyanate terminated oxetane polymers to result in block copolymers of the AB type or A(BA)$_x$ types where x can be from 1 to 20, desirably from 1 to 10, and where the fluorinated oxetane polymers are either the A or B block. Additionally, the poly(alkylene oxide) polymers may be isocyanate terminated by reacting them with similar polyisocyanates to those used with the oxetane based polymers. Then the poly(alkylene oxide) polymers can be mixed with the oxetane based polymers. Most desirably the polyols from said oxetane polymers with pendant perfluorinated groups are first isocyanate terminated using a large excess of isocyanate and these blocks are chain extended with one or more polyol blocks which are free of perfluorinated pendant groups. This helps compatibilize the oxetane blocks with the rest of the composition and prevents inhomogeneity.

When the coating composition is to be used on an elastomeric substrate such as a vehicle glass run channel, door seal, or belt strip for glass windows it is desirable to include adhesion promoters in the composition. A preferred adhesion promoter is hydroxyl terminated hydrogenated diene polymers. The various hydroxyl terminated diene based polymers are well known to the art. Examples include anionically polymerized dienes which are given hydroxyl groups in the chain termination step or free radically polymerized dienes such as those initiated with hydrogen peroxide. These polymers in hydrogenated form are described in U.S. Pat. Nos. 5,115,007 and 5,221,707 which are herein incorporated by reference to teach this aspect plus other aspects of coating elastomeric substrates. These polymers desirably have a number average molecular weight from 500 to 15,000 and more preferably from 1,000 to 8,000. The monomers used to form the polymers are olefins having from 2 to 6 carbon atoms. The polymers desirably have from 2 to 6 and more desirably from 2 to 4 hydroxyl end groups per molecule. Desirably the polymers are substantially hydrogenated (such that at least 95 percent of residual unsaturation after polymerization is removed by hydrogenation). The hydroxyl terminated hydrogenated diene polymers are preferably at least 90 weight percent repeat units derived from conjugated dienes but may optionally have up to 20 or 50 mole percent of ethylenically unsaturated comonomers having from 2 to 10 carbon atoms and substituents including aromatics, halogens, cyanides, esters, and hydroxy esters. A preferred hydroxyl terminated hydrogenated diene polymer is Polytail H by Mitsubishi which has hydrogenated vinyl, trans 1,4, and cis 1,4 repeat units and 2 or more hydroxyls per molecule. Poly(alkylene oxides) having 4 carbon atoms per repeat unit also enhance adhesion to elastomeric substrates. The hydroxyl terminated adhesion promoters may be from 0 to 75, more desirably from 10 to 70 weight percent of the repeat units of the isocyanate or blocked isocyanate terminated polymers or chain extended isocyanate terminated block copolymers.

The polyisocyanates useful are R(NCO)$_n$ where n is an average from 1.7 to 4 and preferably from 2 to 4 and R is aliphatic, aromatic, or combinations thereof (i.e. partially aromatic and partially aliphatic) having 4 to 100 carbon atoms and preferably from 4 to 20 or 30 carbon atoms. Preferred aromatic diisocyanates include 4,4-methylene diphenyl isocyanate (MDI), as well as modified and polymeric MDI known as Isonates™ or Papi™ from Dow Chemical (these are often liquid at room temperature rather than solids), toluene diisocyanate, 1–6-hexane diisocyanate, trimethylhexane diisocyanate, isophorone diisocyanate and the like. Also useful are diisocyanates partially reacted with polyols or polyamines of less than 300 molecular weight to form isocyanate terminated oligomers.

When it is desirable to form a one component coating that does not cure unless subjected to heat or other activating source the unreacted isocyanate groups of the isocyanate terminated polymers such as poly(alkylene oxide), polycaprolactone, and oxetane polymers are blocked with blocking agents. The blocking agents desirably deblock at low temperatures such as from about 80° to 220° C. and desirably from about 80° to 170° C.

Suitable blocking agents include ketoximes, triazoles and imidazoles, phenols, lactams, and and the like. Another group of blocking agents are various cyclic ureas having from 3 to 12 carbon atoms such as trimethylene or tetramethylene urea. The ketoximes generally have about 3 to about 20 carbon atoms and desirably from about 3 to about 15 carbon atoms and include dimethyl-methylethyl-, diisopropyl-, or dicyclohexylketoxime, benzophenone, and the like, with methyl-ethyl ketoximine being highly preferred. The triazoles and imidazoles generally have a total of from 2 to 10 carbon atoms and include benzotriazole, tolytriazole, phenylimidazole, and the like with benzotriazole being preferred. The phenols having 6 to 20 carbon atoms constitute another class of suitable blocking agents and specific examples of such are well known to the art and to the literature including phenol, nonylphenol, and the like. The lactams generally contain a total of from about 3 or 4 to 12 carbon atoms and are also well known to the art and to the literature with specific examples including epsilon-caprolactam, lauryl lactam, and the like. The amount of blocking agent should be sufficient to create an equivalent ratio of blocking agent/NCO group greater than 1, preferably not above 1.2. Preferred blocking agents include ketoximes, caprolactam, phenols, and triazoles.

Crosslinking agents are incorporated to increase the crosslink density of the cured coatings. Increased crosslink density can result in improvements in physical properties such as abrasion resistance. Effective crosslinking or curing agents include those containing one or more of $-NH_2$ groups, $-NHR_6$ groups where $R_6$ is an alkyl having from 1 to 4 carbon atoms, OH groups or SH groups and the like, which react with the unblocked isocyanate groups of the coating composition. Such crosslinking agents are well known to the isocyanate art.

Particularly preferred crosslinking agents are aliphatic, primary or secondary, di, tri and tetrafunctional amines having boiling points above 100° C. and preferably above 180° C., including di, tri, and tetrafunctional amines from poly(oxypropylene) or poly(oxy(propylene/ethylene)) such as Jeffamines™ from Texaco having number average molecular weights from less than 200 to greater than 5,000. Included are polyamidoamine resins containing amino end groups sold by Henkel Corp by tradenames Versamid™ or Genamid™; isophoronediamine, mixed trimethylenediamine (TMD), N,N$^1$-diaminoethyl-piperazine, N-aminoethylpiperazine, 1,4-cyclohexanediamine, 1,6-hexanediamine, 1,4-butanediamine, diethylenetriamine, xylylenediamine, ethylenediamine, aromatic di or triamines which are liquid or soluble in the coating composition such as ring methylated phenylenediamine or poly(tetramethylene oxide)-bis(4-aminobenzoates) and the like.

Other useful crosslinking agents include polyols (diols, triols or tetrols) having a number average molecular weight of from about 200 to about 8,000 or 10,000, which may be used either alone or in combination with diamines, and generally have a total of from 2 to about 100 carbon atoms. Desired polyols desirably have primary hydroxyl groups, as well as tertiary, secondary or primary amino groups in their structures, such as triethanolamine, diethanolamine or ethanolamine. Curatives with two or more sulfuryl groups or combinations of $NH_2$, OH and SH can also be utilized.

The ratio of blocked isocyanate groups to curative groups ($-NH_2$, $-NHR_6$, OH, or $-SH$) of the cross-linking agents is generally from about 0.8 to infinity, that is, where no curing agent is utilized, desirably from about 1 or 2 to about 20, 30, or 50, more desirably from about 2 to about 10 or from about 2 to about 6 and on some occasions, from about 0.8 to about 2.0, and preferably from about 1.0 to about 2.0. In the case where less than the stoichiometric amount of curing agent is used or no curing agent is used, the prepolymers can be moisture cured. Shelf life of coatings containing a crosslinking agent, such as polyamine, is desirably at least about two weeks at ambient temperatures.

Although curing of blocked polyurethanes with a polyamine curing agent normally does not require an added catalyst, urethane curing catalysts can be utilized, especially if polyols are used as curatives. Such catalysts are well known to the art and to the literature and include, for example, stannous octoate, various tin catalysts such as dioctyltin dilaurate, dibutytin dilaurate, etc., and various tertiary amines. Advantageously, these catalysts are added during the preparation of the isocyanate terminated polyols to assist in the formation of the isocyanate terminated prepolymer and/or to facilitate the blocking of the isocyanate groups. The amount of the catalyst is generally from about 0.1 percent to about 5 percent catalyst by weight based upon the total amount, by weight, of reactants which form the blocked polyurethane.

Cure, that is, crosslinking of the prepolymers as well as other reactions, is generally carried out at from about 80° C. to about 255° C., desirably from about 160° C. to about 250° C., and preferably from about 170° C. to about 230° C. especially when blocked isocyanates are used. When unblocked isocyanates are used the lower temperature can be as low as 20° C.

Coating compositions containing the oxetane polymers having highly fluorinated side chains inherently have low surface energy surfaces and low coefficients of friction. Accordingly, they do not need silicone oil to achieve low coefficients of friction. Desirably these coatings are essentially free of silicone oil (i.e. less than 0.5 weight percent silicone oil based on the polymeric binders of the coating or less than 0.1 weight percent). Silicone oils are know to bloom to the surfaces of coatings and from there are physically transferred to nearby surfaces where they interfere with subsequent painting or finishing operations. Silicone oils are defined as liquid or fluid silicone polymers either as free polymers or attached to other components having a silicone backbone structure comprising alternate silicon and oxygen atoms with the general structure $$-(SiR^1R^2-O)_n$$

where $R^1$ and $R^2$ are independently an alkyl group of 1 to 20 carbon atoms or aromatic of 6 to 20 atoms and n is from 2 to 5,000. Silicone oils may also contain repeat units of fluoroalkyl as well as units containing chlorine, alkoxy, and other substituents as long as the repeat units are predominantly silicone repeat units (i.e. greater than 50 mole percent).

The coating composition may include powder, micropowder, or dispersions of silica, nylon, polyethylene, poly(tetrafluoroethylene), fluorinated ethylene propylene copolymers, polystyrene, molybdenum disulfide, glass beads and the like. The above polymers generally have a number average molecular weight above 500, 1000 or 5000. Solvents such as xylene, toluene, N,N-dimethylformamide, N-methylpyrolidone, tetrahydrofuran, ethers, etc. may be used to control the viscosity of the coating or for related purposes, pigments such as carbon black, titanium dioxide or similar color opacifying agents may be added. Agents to resist degradation in the use environment may be added. Such agents include antifungal agents, U.V. and ozone resistors etc.

The coating composition of this invention may be applied over a temperature range from below ambient (approximately 20° C.) to above 200° C. It may be applied to a variety of substrates such as elastomers, plastics, metals, woods, and other construction materials. Elastomers are defined herein as polymers capable of reversible elongation of at least 10, 20, 50, or 100 percent. EPDM is defined herein as an elastomer comprised of monomers, ethylene, propylene and one or more nonconjugated dienes. A preferred substrate is an elastomer such as EPDM used for glass run channel. The coating compositions may be applied by known methods such as by dipping, wiping, rolling, spraying, coextrusion etc. When applied as a coating on an elastomer, the coating is desirably one having blocked isocyanates in the uncured coating and desirably the coating cures in a few minutes at temperatures above 80° C. and preferably from 170° C. to 230° C. When applied to an elastomeric substrate the coating may be applied either before, concurrently with, or after vulcanization of the elastomeric substrate. Desirable cured coating thicknesses are from 1 or 2 to 100 or 200 μm and more preferably from 15 to 60 μm.

The polymerization of highly fluorinated oxetane monomers is disclosed in U.S. patent application Ser. No. 07/911, 461 filed Jul. 10, 1992, U.S. Pat. No. 5,412,710 and a continuation-in-part thereon, U.S. application Ser. No. 08/080,614 filed Jun. 21, 1993 now abandoned. The inventors of those U.S. patent applications were Aslam Malik et al. The text below concerning those monomers and polymerization thereof incorporates material from those applications.

The oxetane monomers are desirably obtained from the reaction of aryl sulfonate derivatives of hydroxyalkyl oxetanes with fluorinated alkoxides of the structure HO—(CH$_2$)$_n$R$_f$. The aryl sulfonate derivatives of the hydroxyalkyl oxetanes have the general formula:

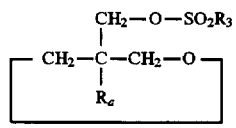

wherein

R$_a$ is as described above

R$_3$ is a monocyclic aryl having from C$_6$ to C$_{10}$ carbon atoms e.g. benzyl, tolyl, xylyl, or mesityl. The preferred sulfonates are toluene sulfonates, e.g. p-toluene sulfonate derivatives of oxetane.

The fluorinated alkoxides are obtained by reacting fluorinated alcohols with sodium hydride in a suitable solvent such as dimethylformamide. The fluorinated alcohols which can be used have the general structure

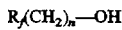

wherein R$_f$ and n are as described above. Preferred alcohols are trifluoroethanol, heptafluorobutanol, pentadecafluorooctanol, and tridecylfluorooctanol, etc. versions of the above containing other halogens selected from Br, I, and Cl are included in the following list.

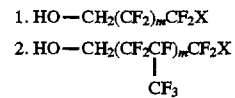

wherein X is a halogen such as bromine, chlorine, iodine, or fluorine;

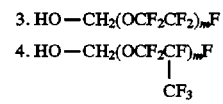

and wherein m is from about 2 to about 20.

The fluorinated alkoxy oxetane monomers readily polymerize in the presence of a Lewis acid catalyst and a polyhydroxy aliphatic compound as a polymerization initiator.

Suitable catalysts are Lewis acids, i.e., compounds capable of accepting a pair of electrons, examples of which include: complexes of boron trifluoride, phosphorus pentafluoride, antimony pentafluoride, zinc chloride, aluminum bromide, etc.

Suitable initiators are polyhydroxy aliphatic compounds such as alkyl and isoalkyl polyols having from 2 to about 5 carbons and from 2 to 4 hydroxyls, e.g., ethylene glycol, butane-1,4-diol, propylene glycol, isobutane-1,3-diol, pentane-1,5-diol, pentaerythritol, etc.

The polymerization is conducted in the presence of a suitable inert solvent, preferably a halogenated C$_1$ to C$_5$ hydrocarbon, e.g., methylene chloride, methylene bromide, ethylene dichloride, ethylene dibromide, propylene dichloride, Freons®, fluorinated solvents, etc.

The catalyst and initiator are preferably mixed in the solvent prior to the addition of the oxetane monomer. An example of a preferred catalyst, initiator and solvent combination is the boron trifluoride etherate, or boron trifluoride tetrahydrofuranate, and butane-1,4-diol in methylene chloride.

To this mixture the monomer is added and solution polymerization is practiced at solution concentrations from 5 to 75 weight percent. In the polymerization, the concentration of the catalyst and the proportions of the initiator, e.g., butane-1,4-diol, can be varied to control the molecular weight of the polymer, with higher proportions of initiator resulting in lower molecular weight of the prepolymer product. Useful proportions of boron trifluoride catalyst to initiator can be from about 100:1 to about 1:2.

The polymerization terminates with the formation of the hydroxy-terminated polymer according to the following mechanism:

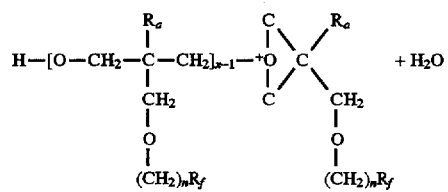

-continued

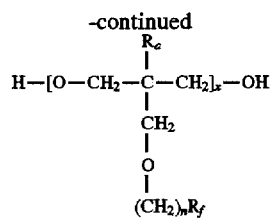

The polymerization can be homopolymerization or copolymerization in which a mixture of two or more of the aforementioned oxetane monomers is added to the polymerization zone. A particularly useful copolymerization is block polymerization in which the comonomers are sequentially added in selected proportions to obtain block copolymers of controlled block sizes and properties.

To prepare prepolymers with the optimum coating properties, the oxetane monomer desirably has a 3-substituent in which the $R_f$ group has its omega carbon fully fluorinated. One of the main applications of the hydroxy-terminated prepolymers of this invention is in the development of hydrophobic, non-stick low friction coatings. The most important criteria in the development of these coatings is the minimization of the free surface energy of the coating, which is a measure of the wetability of the coating and defines critical properties, such its hydrophobicity and adhesive characteristics. Terminal carbons which contain hydrogen, e.g., —$CF_2H$ or —$CFH_2$ or —$CH_3$, have significantly greater surface energies (15–39 dynes/cm) than those with fully halogenated groups, e.g., those with —$CF_3$ groups, which have surface energies of about 6 dynes/cm.

Most preferably, the 3-substituent ($R_f$) is perfluoroalkyl. The perfluoroalkyl group is an extremely strong electron withdrawing group and its presence changes the electronic and steric properties, of the oxetane monomers. This affects the ease of their polymerization and the functionality, molecular weight, and structure, i.e., cyclic or linear, of the polymer. The most useful hydroxy-terminated prepolymers with fluorinated side chains are those which are well defined and which have a functionality of at least 2. Presence of non-functional or mono-functional materials in the prepolymers results in coatings with poor mechanical and surface properties.

Cyclic groups, mainly cyclic tetramers and trimers, in the polymer are non-functional and reduce the usefulness of the prepolymers. Other non-functional groups can be formed by counter-ion terminations, such as diethyl ether and fluoride ion terminations. In addition to the role of the fluoroalkyl substituent on the oxetane on its reactivity, other factors control the formation of non- and mono-functional materials, such as the monomer/initiator ratio, ratio of alcohol to Lewis acid, type of Lewis acid, reaction temperature, solvent, and concentration.

It is also preferred to use oxetanes substituted in the three position with a single fluorinated alkyl unit as described above. These are preferred, since homopolymerization of di-3-haloalkyl-substituted oxetane monomers yields crystalline polymers. As an example, polymerization of 3,3-bis-(chloromethyl)oxetane yields a crystalline polymer that melts in the neighborhood of 220° C.

The hydroxy-terminated prepolymers prepared from the preferred mono-3-substituted oxetane monomers are amorphous, low viscosity oils which are easy to process. The prepolymers are relatively pure, whereas those derived from di-3-substituted oxetane monomers contain large amounts of nonfunctional cyclic oligomers. Also, the desired surface properties of the prepolymer can be achieved with only one fluorinated substituent in the 3 position of the oxetane monomer, and a second fluorinated substituent does not significantly contribute to the surface properties.

The following examples show the monomer preparation and the polymerization with boron trifluoride etherate, or boron trifluoride tetrahydrofuranate, in butane-1,4-diol. The initiator was prepared from commercial grade boron trifluoride etherate which was distilled prior to use. Similarly, the butane-1,4-diol was distilled from calcium hydride and stored over a 4Å molecular sieve prior to use.

FLUOROALCOHOL EXAMPLE 1

PURIFICATION OF COMMERCIAL FLUOROALCOHOLS

Zonyl™ BA-L is a narrow distribution, oligomeric mixture of fluoroalcohols that is available from Dupont Chemicals in pilot plant quantities. Zonyl™ BA-L is a yellow liquid which by GLC is a mixture of the following oligomers: 3,3,4,4,5,5,6,6,7,7,8,8,8-tridecafluorooctan-1-ol ($C_8$, 60%); 3,3,4,4,5,5,6,6,7,7,8,8,9,9,10,10,10-heptadecafluorodecan-1-ol ($C_{10}$, 26%); 3,3,4,4,5,5,6,6,7,7,8,8,9,9,10,10,11,11,12,12,12-heneicosafluorododecanol ($C_{12}$, 6%); and various unidentified high boiling compounds (8%). Zonyl™ BA-L was washed with equal volumes of 10 weight percent aqueous sodium thiosulfate, 10 weight percent aqueous sodium bicarbonate (to remove HF), water, and brine, dried, filtered, and distilled under reduced pressure (3 mm-Hg) at 50°–100° C. to give a mixture of 69 percent $C_8$, 26 percent $C_{10}$ and 5 percent $C_{12}$ in 83 percent yield.

MONOMER EXAMPLE 1

PREPARATION OF 3-(2,2,2-TRIFLUOROETHOXYMETHYL)-3-METHYLOXETANE

A dispersion of 50 weight percent (2.8 grams, 58.3 mmol) sodium hydride in mineral oil, was washed twice with hexanes and suspended in 35 milliliters of dimethyl formamide. Then, 5.2 grams (52 mmol) of trifluoroethanol was added and the mixture was stirred for 45 minutes. A solution of 10.0 grams (39 mmol) of 3-hydroxymethyl-3-methyloxetane p-toluenesulfonate in 15 milliliters of dimethyl formamide was added and the mixture was heated at 75°–85° C. for 20 hours, when $^1H$ NMR analysis of an aliquot sample showed that the starting sulfonate had been consumed.

The mixture was poured into 100 milliliters of ice water and extracted with 2 volumes of methylene chloride. The combined organic extracts were washed twice with water, twice with 2 weight percent aqueous hydrochloric acid, then with brine, and then dried over magnesium sulfate, and evaporated to give 6.5 grams of 3-(2,2,2-trifluoroethoxymethyl)-3-methyloxetane as an oil containing less than 1 weight percent dimethyl formamide. The yield of this product was 90 percent. The oil was distilled at 30° C. and 0.2 millimeters mercury pressure to give 4.3 grams of analytically pure product, corresponding to a 60 percent yield.

MONOMER EXAMPLE 2

PREPARATION OF 3-(2,2,3,3,4,4,4-HEPTAFLUOROBUTOXYMETHYL)-3-METHYLOXETANE

A 50 weight percent dispersion of sodium hydride 6.1 grams (127 mmol) in mineral oil, was washed twice with hexanes and was suspended in 60 milliliters of dimethyl formamide. Then 24.0 grams (120 mmol) of 2,2,3,3,4,4,4-heptafluorobutan-1-ol was added and mixture was stirred for 45 minutes. A solution of 25.0 grams (97.5 mmol) of 3-hydroxymethyl-p-toluenesulfonate in 15 milliliters of dimethyl formamide was added and the mixture was heated at 75°–85° C. for 30 hours when $^1$HNMR analysis of an aliquot showed that the starting sulfonate had been consumed.

The mixture was poured into 100 milliliters of ice/water and extracted with two volumes of methylene chloride. The combined organic extracts were washed twice with water, twice with 2 weight percent aqueous hydrochloric acid, then with brine, dried over magnesium sulfate, and evaporated to give 27.5 grams of 3-(2,2,3,3,4,4,4-heptafluorobutoxyethyl)-3-methyloxetane as an oil. The oil was distilled at 33° C. and 0.2 millimeters mercury pressure to give 12.2 grams of analytically pure ether, corresponding to a 44 percent yield. The calculated elemental analysis for $C_9H_{11}F_7O_2$ is C=38.04; H=3.90; F=46.80. The experimental analyses found: C=38.03; H=3.65; and F=46.59.

POLYMERIZATION EXAMPLE 1

PREPARATION OF POLY-3-(2,2,3,3,4,4,4-HEPTAFLUOROBUTOXYMETHYL)-3-METHYLOXETANE

A solution of 34.7 milligrams (0.38 mmol) of butane-1,4-diol and 109.7 milligrams (0.77 mmol) of boron trifluoride etherate in 3.4 grams of methylene chloride was stirred at ambient temperature for 15 minutes under nitrogen in a dry polymerization flask. The solution was cooled to 1.5° C. and a solution of 2.00 grams (7.08 mmol) of 3-(2,2,3,3,4,4,4-heptafluorobutoxymethyl)-3-methyloxetane in 3.3 grams of methylene chloride was added. The resultant solution was stirred for 4 hours at 1.2° C.; at which time $^1$H NMR analysis of an aliquot indicated that the starting oxetane had been consumed.

The solution was warmed to ambient temperature and quenched with water. The organic layer washed with brine, 2 percent aqueous hydrochloric acid, and evaporated to give 1.65 grams of poly-3-(2,2,3,3,4,4,4-heptafluorobutoxymethyl)-3-methyloxetane, corresponding to an 83 percent yield. The prepolymer was an oil and had the following analyses: GPC (THF) Molecular weight Mn 4066, Mw 5439, polydispersity 1.34, inherent viscosity 0.054. This oil was extracted with methanol and dried to give 1.46 grams of polymer, corresponding to a 72 percent yield. The polymer had a Mn of 4417, Mw of 5658, and an inherent viscosity of 0.056.

POLYMERIZATION EXAMPLE 2

COPOLYMERIZATION OF 3-(2,2,2-TRIFLUOROETHOXYMETHYL)-3-METHYLOXETANE WITH 3-(2,2,3,3,4,4,4-HEPTAFLUOROBUTOXYMETHYL)-3-METHYLOXETANE

A solution of 35 grams of 3-(2,2,2-trifluoroethoxymethyl)-3-methyloxetane (190 mmol) and 183 grams of 3-(2,2,3,3,4,4,4-heptafluorobutoxymethyl)-3-methyloxetane (644 mmol) in 50 milliliters of 1,1,2-trichlorotrifluoroethane was added to a mixture of 0.390 gram of 1,4-butanediol (4.33 mmol), 1.55 grams of boron trifluoride tetrahydrofuranate (11.1 mmol), and 100 milliliters of methylene chloride at 18° C. in a similar fashion to polymerization Example 1. The mixture was stirred at 18° C. for 3 hours, quenched with water, and precipitated into methanol to give, after drying at 85° C./2 mm-Hg for 16 hours, 186 grams of a clear, colorless oil, corresponding to 85 percent yield. NMR analysis revealed that this material was a 22:78 random copolymer of the above two monomers.

The polymer analyses were: DSC, $T_g$=–42° C.; GPC (THF, polystyrene standard) Number Average Molecular weight was 15,660; Weight Average Molecular Weight was 30,640; Polydispersity was 1.96; Number Average Molecular Weight by $^1$H NMR was 18,400; Functionality was 2; and Inherent viscosity was 0.071.

In a similar manner, random copolymers of above monomers in 50:50 and 75:25 ratios were also prepared. The copolymers were clear, colorless oils that were soluble in tetrahydrofuran, methylene chloride and 1,1,2-trichlorotrifluoro-ethylene (Freon™ 113).

The above recited polymers from oxetane monomers may also be copolymers of oxetanes with other cyclic ether monomers such as tetrahydrofuran. These polymers result in surface coatings having low surface energies. These polymers avoid many of the problems of crystalline fluorinated polymers which are harder to mold and fabricate. The weight average molecular weight of these oxetane polymers before reactions with polyisocyanates are desirably from 500 to 1,000,000, and more desirably from 100 or 5,000 to 50,000 or 400,000. The preferred number of repeat units per oxetane polymer block is from 2 to 250 and preferably a number average of repeat units from about 40 to about 80.

These polymers including those derived from oxetane monomers are formulated into coatings by reacting the terminal groups (desirably the terminal groups are hydroxyls) with polyisocyanates (desirably the isocyanates are primarily diisocyanates or higher functionality isocyanates). Other terminal groups on the polymers derived form oxetane monomers may be created by termination reactions or by post reacting hydroxyl groups with other molecules to create other terminal groups. These reactions to change terminal functional groups are well known to the art.

The coating compositions and coatings of this invention are useful as low friction coatings and low surface energy coatings on glass run channels, belt strips, weatherstripping, sponge type door gaskets, windshield wipers, engine mounts, luggage, household goods, plastics, metals, fibers, wood, fabrics, industrial equipment, and household or commercial equipment.

Glass run channels and belt strips are descriptive names for a variety of articles (usually elastomeric) used to sealingly engage windows. Glass run channels provide at least one channel for retaining and guiding the movement of a window. A glass run channel usually provides one or more surfaces for sealing the contact region between the window and the channel. Belt strips are articles used to sealingly engage windows but usually do not by themselves define a channel to guide the glass. In automobiles belt strips may be used a the top and bottom sections of a movable window to seal against window that moves up and down while glass run channels would be used to seal the sides of the window.

Solvents, when utilized in the present invention, are generally nonpolar and non reactive with the various urethane composition components (such as isocyanates) and thus generally exclude alcohols, amines, carboxylic acids, and the like. Suitable nonpolar hydrocarbon solvents, when utilized, generally include aromatic compounds such as toluene, xylene, and the like, various ketones such as acetone, internal ethers such as tetrahydrofuran, diethylene ether, various amides such as dimethylformamide and N-methylpyrollidone, and various alkanes having from about 6 to 12 carbon atoms as hexane, heptane, and the like. The solvent mixtures can be adjusted to optimize coating processing characteristics.

The final coating composition is directly applicable to EPDM without primer or surface treatment. As a solvent based system, the coating can be applied by spray or drip and wipe processes. It may also be applied to the surface of a weatherstrip in the die during actual extrusion (in-die coating or co-extrusion). In addition, the coating materials may be desolventized and applied as a viscous liquid by a coextrusion process or sprayed on the surface of a weatherstrip as a hot melt. Such solventless processes are especially desirable since their use results in reduced volatile organic compounds (VOC) being emitted to the atmosphere. The coatings were cured for 10 minutes at 200° C. Shorter cure times and lower temperatures should be possible since DSC results showed that the deblocking and curing reactions occur at lower temperatures.

The utility of this invention can be readily seen by examination of the following experimental examples.

BLOCKED ISOCYANATE TERMINATED PREPOLYMERS, EXAMPLES

A. Prepolymer of MDI/Hydrogenated Polybutadiene, Blocked with Methyl Ethyl Ketoxime.

MDI, (Mondur™ M) 4,4'-diphenylmethane diisocyanate, 55.0 grams @ 8 meq NCO/gram to give 440 milliequivalents NCO and toluene, previously dried through 5 Å molecular sieves, 492.57 grams were charged into a clean, dry, 3 liter, 3 necked reaction flask equipped with argon inlet, stirrer, thermocouple, condenser and outlet bubbler.

The contents were heated to 110° C., the reflux temperature of toluene. A slightly turbid solution was observed. Samples of this solution were taken and the isocyanate content determined by using dibutylamine as reactant and bromphenol blue as indicator. The isocyanate content was found equal to 0.924 meq NCO/gram solution.

The following solution was prepared for addition. The solution was made at 10 percent by weight excess to allow for holdover losses during transfer. 363.66 grams of hydrogenated polybutadiene in toluene at 61.2 percent solids was diluted with 1119.8 grams toluene. The solution was heated in a closed can to 80° C. and mixed to homogenize.

Over two hours, 1348.6 grams of the hydrogenated polybutadiene solution was added to the MDI solution which was kept at 110° C. and vigorously stirred throughout addition. The added solution contained 1281.1 grams toluene and 202.3 grams hydrogenated polybutadiene at 0.87 meq OH/gram to give 176.1 meq OH. The molar ratio of NCO/OH was 2.5. The reaction was kept at 110° C. for two hours after the end of the addition step. After this time, the isocyanate content was determined. The NCO content was 0.0897 meq/gram solution, or 64 percent of theoretical 0.139 meq/gram. Infrared analysis revealed an absorbance at 2250 $cm^{-1}$ indicating the presence of isocyanate in the product.

The amount of methyl ethyl ketoxime (MEKO) needed was calculated as 15.56 grams and this amount was added. This was a 5 percent excess to the calculated residual NCO after reaction with the hydrogenated polybutadiene. The solution was refluxed at 110° C. overnight. In the morning, a sample taken showed no residual NCO by infrared. The contents were cooled to 60° C. and transferred to a can and sealed for future use in coating evaluations.

B. Prepolymer of MDI/PPG 2025 Blocked with Methyl Ethyl Ketoxime.

MDI, (Mondur™ M) 4,4'-diphenylmethane diisocyanate, 24.96 grams @ 8 meq/gram to give 199.68 meq NCO, Toluene, dried through 5 Å molecular sieves, 588.0 grams, and Dabco™ T-9 stannous octoate catalyst (Air Products), 0.19 grams were added into a clean, dry, 1 liter resin kettle equipped with argon inlet, stirrer, condenser and outlet bubbler.

The vessel contents were heated with stirring to 110° C., the reflux temperature of the toluene, to give a slightly opaque solution.

To the above stirring isocyanate solution, vacuum-oven dried PPG 2025 polypropylene glycol nominally 2000 MW was added dropwise over 1 hour and 55 minutes. The contents were stirred at 110° C. for two hours after addition was complete. The contents were allowed to cool overnight. In the morning, the contents were heated to 100° C. and sampled for infrared analysis and isocyanate content by dibutylamine titration. The NCO content was found to be 0.1275 meq NCO/gram of solution. This was 73.83 percent of the theoretical based upon completely pure MDI and no impurities in the system. The infrared spectrum showed absorbance at 2250 $cm^{-1}$ indicating NCO was present. The amount of methyl ethyl ketoxime needed to block the residual NCO was calculated from the determined NCO and materials balance. 7.30 grams of MEKO was added (3.6 percent excess) and the blocking reaction was allowed to occur at 110° C. for two hours. A sample was taken and the infrared spectrum showed no absorbance at 2250 $cm^{-1}$. The blocking reaction was complete. The contents were cooled with stirring to 40° C. and transferred to a pre-weighed can until used in coatings evaluation. 595.9 grams of product were recovered.

C. Preparation of MDI/Poly(oxetane) with $CH_2$—O—$CH_2$—O—$C_3F_7$ side chains/PPG 2025 Blocked With Methyl Ethyl Ketoxime.

MDI, (Mondur™ M) 4,4'-diphenylmethane diisocyanate, 23.03 grams @ 8.0 meq NCO/gram to give 184.24 meq NCO, Toluene, dried through 5 Å molecular sieves, 678.8 grams, and Dabco™ T-9 stannous octoate catalyst, 0.17 grams were added into a 1 liter, clean, dry, resin kettle equipped with argon inlet, stirrer, condenser and outlet bubbler.

The contents were heated under argon purge to 110° C., the reflux temperature of toluene. A slightly turbid solution was observed.

Polyoxetane having $CH_2OCH_2(C_3F_7)$ side chains (called perfluoropropyl side chains), 14.94 grams @ 0.22 meq OH/gram to give 3.29 meq OH was added to the stirring kettle contents over 10 minutes. The reaction was allowed to progress at 110° C. for two hours.

PPG 2025, polypropylene glycol, 54.18 grams @ 1.087 meq OH/gram to give 58.90 meq OH, was added dropwise over 1 hour and 10 minutes and then reacted for 2 additional hours. The solution was allowed to cool with stirring overnight.

The contents were reheated and a sample was taken for infrared analysis and NCO determination. The NCO content was found to be 0.126 meq NCO/gram solution versus 0.158 meq/gram theoretical or 79.75 percent. The infrared spectrum revealed absorbance at 2250 $cm^{-1}$, indicating residual NCO. Based upon the NCO determination and the material balance, the amount of MEKO needed was calculated. 8.30 grams of MEKO (5.7 percent excess) was added. The blocking reaction was done over two hours at 110° C. A sample revealed no absorbance at 2250 $cm^{-1}$ indicating complete blocking. The contents were cooled to 70° C. and were transferred to a can and capped pending evaluation in coatings.

PREPARATION OF COATINGS ON CURED EPDM EXAMPLES

Freshly prepared and cured EPDM stock was used. The EPDM surface to be coated was wiped with toluene, allowed to air-dry, then wiped a second time with acetone. The wipes were done to eliminate any impurities on the surface, either adventitious or from "bloom". When dry, the rubber was coated by being mounted vertically and then being sprayed using an air gun with an aspirator tube. Twenty psi air pressure was used. A known weight of coating was sprayed as a solution in toluene and allowed to dry for several minutes. The coated EPDM was then placed into a 200° C. oven for 10 minutes. The coated EPDM was allowed to stand overnight and the coating was then tested using the Crockmeter.

A. Coating of MDI/Mydrogenated Polybutadiene/MEKO 15.0 grams of Blocked Urethane Prepolymer A from hydrogenated polybutadiene at 15.26 percent solids was diluted with 30 grams of toluene. Then 0.342 grams Jeffamine™ T-403 at 6.1 meq NH/gram was added to give 2.086 meq NH. The NCO after unblocking and available during cure was 1.346 meq based upon pre-blocked NCO content. The ratio of [NH]/[NCO] was 1.55. All of the solution was sprayed onto a 3×8 inch sheet of EPDM. The grams of solids was calculated as 2.289 grams of MDI/hydrogenated polybutadiene. The normalized weight for a 6×8 inch sheet of EPDM=4.58 grams.

B. Coating Blend of MDI/PPG 2025/MEKO with MDI/Hydrogenated Polybutadiene/MEKO.

Blocked Urethane Polymer B, 14.99 grams, from PPG 2025 at 15.39 percent solids was charged to a beaker. Blocked Urethane Polymer A, 15.07 grams, from hydrogenated polybutadiene at 15.26 percent solids was added. Then 0.64 grams of Jeffamine™ T-403 was added, followed by 33.55 grams of toluene. The contents were covered and mixed well. This solution, 34.14 grams, was sprayed onto a 3×8 inch sheet of EPDM. The amount of NH from Jeffamine™ T-403 was 3.904 meq. The amount of NCO available after unblocking was 1.92 meq from the Blocked Urethane Polymer B from PPG 2025 plus 1.35 meq from the Blocked Urethane polymer A from hydrogenated polybutadiene=3.27 meq NCO. The ratio of [NH]/[NCO]=1.19. The normalized weight of solids sprayed for a 6×8 inch sheet of EPDM was 4.89 grams of which 49.78 percent was MDI/hydrogenated polybutadiene and 50.22 percent was MDI/PPG 2025.

C. Coating Blend of MDI/Poly(oxetane) with $CH_2$—O—$CH_2$—$C_3F_7$ side chains/PPG 2025/MEKO with MDI/Hydrogenated Polybutadiene/MEKO.

Blocked Urethane Prepolymer C, 7.5 grams, from $CH_2$—O—$CH_2C_3F_7$ side chains/PPG 2025 at 12.99 percent solids was charged to a beaker. 7.5 grams of blocked Urethane Prepolymer A from hydrogenated polybutadiene at 15.26 percent solids was added. 0.326 grams of Jeffamine™ T-403 was added, followed by 30 grams toluene. The contents were mixed well. This entire solution was sprayed onto a 3×8 inch sheet of EPDM. The amount of NH from Jeffamine T-403 was 1.989 meq. The amount of NCO available after unblocking was 1.618 meq. The ratio of [NH]/[NCO] was 1.229. The normalized weight of solids sprayed for a 6×8 inch sheet of EPDM was 4.24 grams of which 54.03 percent was MDI/hydrogenated polybutadiene and 45.97 percent was MDI/poly(oxetane) with $CH_2$—O—$CH_2$—$C_3F_7$ side chains/PPG 2025.

D. For comparison purposes, EPDM with no coating was also examined on the crockmeter. The crockmeter test corresponds with GM 6275M Type B test where a hemisphere shaped plate of glass having a radius of 10 mm and a thickness of 4 mm also having rounded edges and a satin finish is slid along 150 mm of a glass run channel with an approximately 3 kg load at 60 cpm. Much abraded rubber was observed in samples without coatings, even in the first few cycles. The test was discontinued after only 60 cycles. The voltage measured during the test was 1.95.

Comparative Crocheter Test Results For Coatings On EPDM

The modified crockmeter abrasion tester used in Table I consists of a rounded sliding glass edge under a vertical load of 2.729 kg. The glass slides upon the coating at approximately 1 cycle/second. The glass surface is cleaned every 5000 cycles with 3M Co. Blue Grit Utility Cloth J wt. #280. The crockmeter is equipped with a sensor to measure the force required to slide. The running voltages required to move the glass and the corresponding number of rub cycles were recorded by computer. Examples of coating compositions and comparative results are given in the attached table. When noticeable black rubber wear was observed, the number of cycles was recorded.

Coating thickness was established using an optical microscope after crockmeter testing.

TABLE I

| COMPARATIVE CROCKMETER TEST RESULTS FOR COATING ON EPDM | | | | |
|---|---|---|---|---|
| COATING COMPOSITION | VOLTAGE (100 CYCLES) | VOLTAGE STEADY STATE, RANGE | CYCLES TO FAILURE | CYCLES PER μm, THICKNESS |
| NO COATING | N/A | 1.95 | 60 | N/A |
| NO COATING | N/A | 1.95 | 60 | N/A |
| HYDROGENATED POLYBUTADIENE | 1.59 | 1.26 to 1.32 | 2,045 | 64 |
| HYDROGENATED POLYBUTADIENE | 1.64 | 1.45 to 1.52 | 3,100 | 89 |
| PPG 2025/HYDROGENATED POLYBUTADIENE | 1.893 | 1.77 to 1.85 | 2,606 | 65 |
| PPG 2025/HYDROGENATED POLYBUTADIENE | 1.962 | 1.79 to 1.84 | 2,525 | 68 |
| POLY(OXETANE) WITH $CH_2$—O—$CH_2$—$C_3F_7$ SIDE CHAINS/PPG 2025/ HYDROGENATED | 1.024 | 0.93 to 0.975 | 10,000 | 512 |

TABLE I-continued

COMPARATIVE CROCKMETER TEST RESULTS FOR COATING ON EPDM

| COATING COMPOSITION | VOLTAGE (100 CYCLES) | VOLTAGE STEADY STATE, RANGE | CYCLES TO FAILURE | CYCLES PER μm, THICKNESS |
|---|---|---|---|---|
| POLYBUTADIENE POLY(OXETANE) WITH $CH_2$—O—$CH_2$—$C_3F_7$ SIDE CHAINS/PPG 2025/ HYDROGENATED POLYBUTADIENE | 1.127 | 0.82 to 0.92 | 10,002 | 451 |

Surface Energetics for Fluorinated Oxetane Based Coatings on EPDM

Liquid contact angle measurements shown in Table II were made using a Kernco Goniometer. Distilled water and methylene iodide were used as wetting liquids. The contact angle data were used to calculate the surface energetics of the various coatings, using the surface model as published by S. Wu, *J. Polymer Sci.*, C 34, pp 19–30 (1971).

TABLE II

SURFACE ENERGETICS RESULTS

| POLYURETHANE COATING | CONTACT ANGLE | | SURFACE ENERGY, ERGS/SQ. CM. | | |
|---|---|---|---|---|---|
| | $H_2O$ | $CH_2I_2$ | γD | γP | γTOTAL |
| EPDM | 94.4 | 59.3 | 25.5 | 5.5 | 31.0 |
| TEFLON | 111.7 | 79.0 | 22.1 | 0.4 | 22.5 |
| POLY(OXETANE) WITH*** SIDE CHAINS OF $CH_2$—O—$CH_2$—$CF_3$ $CH_2$—O—$CH_2$—$C_3F_7$/PPG/ H-POLYBUTADIENE | 111.9 | 95.7 | 10.9 | 4.5 | 15.4 |
| VERSIKOTE ANALOGUE | 111.2 | 68.2 | —* | —* | —* |
| POLY(OXETANE) WITH** SIDE CHAINS OF $CH_2$—O—$CH_2$—$C_3F_7$/PPG/ HYDROG. POLYBUTADIENE | 102.5 | 95.6 | 9.2 | 9.2 | 18.4 |

*Not able to calculate surface energy due to dissolution of silicone oil into the Methylene iodide. Versikote is a common coating containing silicone oil for automotive glass run channel from polyester and polyether urethane prepolymers.
** This material was described in Example C coating.
*** This material contains the same weight % of fluorinated oxetane material as described in Example C but uses a copolymer.

Table II contains contact angle and surface energy data for coatings of poly(oxetane) with $CH_2$—O—$CH_2$—$C_3F_7$ side chains/PPG (polypropylene oxide)/hydrogenated polybutadiene, and a polyurethane film from a similar fluorinated oxetane copolymer (1/1) of oxetane with $CH_2$—O—$CH_2(C_3F_7)$ side chains and oxetane with $CH_2$—O—$CH_2CF_3$ side chains. For comparison purposes, surface energy results are given for surfaces of EPDM, Teflon™ and a Versikote analogue. Both polyurethane coatings from oxetane monomers with fluorinated side chains had surface energies lower than that of Teflon. For these coatings, contact angles for water were comparable to that of Teflon, however, their contact angles for methylene iodide were significantly higher. When compared with the Versikote coating which is compounded with silicone oil to provide low surface energy, the experimental coating of this invention can provide nearly equivalent water contact angle without the need for silicone fluid.

While in accordance with the Patent Statutes the best mode and preferred embodiment has been set forth, the scope of the invention is not limited thereto but rather by the scope of the attached claims.

What is claimed is:

1. In an article of manufacture including a window movably and sealingly retained in an elastomeric channel having a lubricous, abrasion resistant coating on at least those portions of said channel which contact said window, the improvement wherein said coating is formed by a process comprising:

(a) reacting an excess of diisocyanate with a hydroxyl terminated polymer to produce an isocyanate terminated polymer having urethane linkages, wherein said excess is characterized as an NCO:OH ratio of at least 2, at least 5 percent by weight of said isocyanate terminated polymer being one or more repeat units of the structure

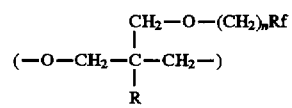

and wherein said repeat units are formed from one or more oxetane monomers and further wherein R is H or an alkyl of from 1 to 6 carbon atoms; and Rf individually on each repeat unit is a linear or branched alkyl of 1 to 20 carbon atoms, a minimum of 75 percent of the H atoms of said Rf being replaced by F and optionally up to all of the remaining H atoms being replaced by I, Cl or Br; or each $R_f$ individually being an oxaperfluorinated polyether having from 4 to 60 carbon atoms, and n is from 1 to 5, (b) chain extending said isocyanate terminated polymer by reacting said isocyanate terminated polymer with a poly(alkylene oxide) polyol, a polyester polyol, or a hydroxyl terminated hydrogenated diene polymer, or combinations thereof, (c) optionally blocking unreacted isocyanate groups in said coating composition, and (d) applying said coating composition to said channel and crosslinking the composition to form said coating.

2. In an article of manufacture according to claim 1, wherein said Rf is a linear or branched alkyl of from 1 to 20 carbon atoms and wherein excess diisocyanate from (a) is present during the reaction of said isocyanate terminated polymer with a poly(alkylene oxide) polyol, a poly(ester) polyol, or a hydroxyl terminated hydrogenated diene polymer.

3. In an article according to claim 2, wherein crosslinking of said abrasion resistant coating is accomplished with an amine crosslinking agent.

4. In an article according to claim 3, wherein the isocyanate groups of said abrasion resistant coating are chemically blocked as one step in forming said coating and wherein said repeat units of the structure

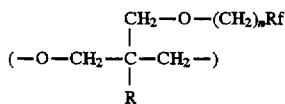

are from 3 to 20 weight percent of said coating.

5. In an article according to claim 2, wherein said elastomeric channel comprises EPDM rubber.

6. A method of using a prepolymer polymerized from oxetane monomers to form a lubricous, abrasion resistant coating composition comprising:

(a) reacting an excess of a diisocyanate with a hydroxyl terminated prepolymer to produce an isocyanate terminated polymer having urethane links, wherein said excess is characterized by an NCO:OH ratio of at least 2, at least 5 percent by weight of said isocyanate terminated polymer being one or more repeat units of the structure

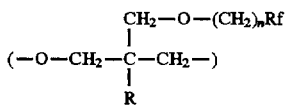

and wherein said repeat units are formed from one or more oxetane monomers and further wherein R is H or an alkyl of from 1 to 6 carbon atoms; and Rf individually on each repeat unit is a linear or branched alkyl of 1 to 20 carbon atoms, a minimum of 75 percent of the H atoms of said $R_f$ being replaced by F and optionally up to all of the remaining H atoms being replaced by I, Cl or Br; or each Rf individually being an oxaperfluorinated polyether having from 4 to 60 carbon atoms, and n is from 1 to 5, (b) chain extending said isocyanate terminated polymer having urethane links by reacting said isocyanate terminated polymer of (a) with a poly(alkylene oxide) polyol, a poly(ester) polyol, or a hydroxyl terminated hydrogenated diene polymer or combinations thereof forming a coating composition, and (c) optionally blocking unreacted isocyanate groups in said coating composition.

7. A method of using a prepolymer according to claim 6, wherein said Rf is a linear or branched alkyl having from 1 to 20 carbon atoms and wherein excess diisocyanate from (a) is present during the reaction of the isocyanate terminated polymer with a poly(alkylene oxide) polyol, a poly (ester) polyol, or a hydroxyl terminated hydrogenated diene or polymer.

8. A method of using a prepolymer according to claim 7, wherein the isocyanate groups of said coating composition are chemically blocked prior to curing.

9. A method of using a prepolymer according to claim 7, wherein said coating composition is cured with an amine crosslinking agent and said repeat units of the structure

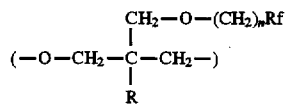

are from 3 to 20 weight percent of said coating composition.

10. A structure adapted to sealingly interact with a movable window comprising an elastomeric portion having a lubricous, abrasion resistant coating on those portions thereof that contact with said window, wherein said coating is made by a process which comprises:

(a) reacting an excess of a diisocyanate with a hydroxyl terminated polymer to produce an isocyanate terminated polymer, wherein said excess is characterized by a NCO:OH ratio of at least 2, at least 5 percent by weight of said isocyanate terminated polymer being one or more repeats units of the structure

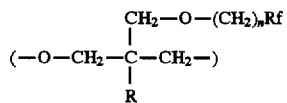

and wherein said repeat units are formed from one or more oxetane monomers and further wherein R is H or an alkyl of from 1 to 6 carbon atoms; and Rf individually on each repeat unit is a linear or branched alkyl of 1 to 20 carbon atoms, a minimum of 75 percent of the H atoms of said Rf being replaced by F and optionally up to all of the remaining H atoms being replaced by I, Cl or Br; or each Rf individually being an oxaperfluorinated polyether having from 4 to 60 carbon atoms, and n is from 1 to 5, (b) chain extending said isocyanate terminated polymer by reacting with a poly(alkylene oxide) polyol, polyester polyol, or a hydroxyl terminated hydrogenated diene polymer or combinations thereof forming a chain extended product, (c) optionally blocking unreacted isocyanate groups in the product of (b)

(d) applying the chain extended product of (b) or (c) to said structure adapted to sealingly interact with a movable window and curing the chain extended product.

11. In an elastomeric structure according to claim 10, wherein said Rf is a linear or branched alkyl of from 1 to 20 carbon atoms and wherein excess diisocyanate from (a) is present during the reaction of said isocyanate terminated polymer with a poly(alkylene oxide) polyol, a poly(ester) polyol, or a hydroxyl terminated hydrogenated diene polymer or combinations thereof.

12. In an elastomeric structure according to claim 11, wherein Rf is an oxaperfluorinated polyether.

13. In an elastomeric structure according to claim 11, wherein the isocyanate groups in the product of (b) are chemically blocked and wherein said repeat units of the structure

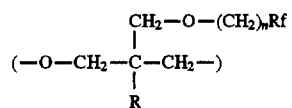

are from 3 to 20 weight percent of said abrasion resistant coating.

14. In an elastomeric structure according to claim 13, wherein said coating is cured with an amine crosslinking agent.

15. In an elastomeric structure according to claim 11, wherein said elastomeric portion comprises EPDM rubber.

* * * * *

UNITED STATES PATENT AND TRADEMARK OFFICE
CERTIFICATE OF CORRECTION

PATENT NO. : 5,674,951
DATED : October 7, 1997
INVENTOR(S) : I. Glen Hargis et al.

It is certified that error appears in the above-indentified patent and that said Letters Patent is hereby corrected as shown below:

On the title page:
Insert after "[73] Assignee: Gencorp Inc., Fairlawn, Ohio" the text "Aerojet General Corporation, Rancho Cordova, California"

Signed and Sealed this

Thirtieth Day of June, 1998

Attest:

BRUCE LEHMAN

Attesting Officer

Commissioner of Patents and Trademarks